(12) United States Patent
Mckitterick et al.

(10) Patent No.: US 9,791,550 B2
(45) Date of Patent: Oct. 17, 2017

(54) FREQUENCY-MODULATED-CONTINUOUS-WAVE (FMCW) RADAR WITH TIMING SYNCHRONIZATION

(71) Applicant: Honeywell International Inc., Morristown, NJ (US)

(72) Inventors: John B. Mckitterick, Columbia, MD (US); Michael R. Franceschini, Centerport, NY (US)

(73) Assignee: Honeywell International Inc., Morris Plains, NJ (US)

( * ) Notice: Subject to any disclaimer, the term of this patent is extended or adjusted under 35 U.S.C. 154(b) by 346 days.

(21) Appl. No.: 14/637,135

(22) Filed: Mar. 3, 2015

(65) Prior Publication Data
US 2016/0025844 A1  Jan. 28, 2016

Related U.S. Application Data

(60) Provisional application No. 62/027,818, filed on Jul. 23, 2014, provisional application No. 62/028,768, filed on Jul. 24, 2014.

(51) Int. Cl.
*G01S 13/02* (2006.01)
*G01S 7/35* (2006.01)
(Continued)

(52) U.S. Cl.
CPC .............. *G01S 7/35* (2013.01); *G01S 7/006* (2013.01); *G01S 7/4004* (2013.01); *G01S 13/87* (2013.01); *G01S 13/343* (2013.01); *G01S 13/94* (2013.01)

(58) Field of Classification Search
CPC ........ G01S 13/343; G01S 13/87; G01S 13/94; G01S 7/006; G01S 7/35; G01S 7/4004

(Continued)

(56) References Cited

U.S. PATENT DOCUMENTS 3,818,378 A   6/1974  Phillips
4,176,351 A  11/1979  DeVita et al.
(Continued)

FOREIGN PATENT DOCUMENTS

CN   201503494 U   6/2010
WO   2008079004 A1   7/2008

OTHER PUBLICATIONS

Response to Extended Search Report dated Jan. 5, 2016 from counterpart European Application No. 15176555.9, filed Jul. 21, 2016, 4 pp.

(Continued)

*Primary Examiner* — Timothy A Brainard
(74) *Attorney, Agent, or Firm* — Shumaker & Sieffert, P.A.

(57) ABSTRACT

Methods, devices, and systems are disclosed synchronizing clocks of FMCW radar units by transmitting a first signal of a first FMCW radar unit, a frequency of the first signal varying over a first frequency range around a first baseband frequency, receiving a second signal at the first FMCW radar unit, a frequency of the second signal varying over a second frequency range around a second baseband frequency, determining values of a plurality of parameters including a first timing offset of the first FMCW radar unit based on a digital difference signal between the first and second signals, receiving a second timing offset of a second FMCW radar unit, determining a clock offset based on the first and second timing offsets, and synchronizing a clock of the first FMCW radar unit with a clock of the second FMCW radar unit based on the clock offset.

18 Claims, 8 Drawing Sheets

(51) Int. Cl.
G01S 7/00 (2006.01)
G01S 7/40 (2006.01)
G01S 13/87 (2006.01)
G01S 13/34 (2006.01)
G01S 13/94 (2006.01)

(58) Field of Classification Search
USPC .......................................................... 342/21
See application file for complete search history.

(56) References Cited

U.S. PATENT DOCUMENTS

| | | | |
|---|---|---|---|
| 4,733,238 | A | 3/1988 | Fiden |
| 5,220,331 | A | 6/1993 | Neininger Gunter |
| 5,270,720 | A | 12/1993 | Stove |
| 5,712,639 | A | 1/1998 | Hethuin |
| 5,892,477 | A | 4/1999 | Wehling |
| 5,999,119 | A | 12/1999 | Carnes et al. |
| 6,107,959 | A | 8/2000 | Levanon |
| 6,313,782 | B1 | 11/2001 | Lehan et al. |
| 6,353,409 | B1 | 3/2002 | Keller et al. |
| 6,633,253 | B2 | 10/2003 | Cataldo |
| 6,856,276 | B2 | 2/2005 | Barrick et al. |
| 7,315,239 | B2 | 1/2008 | Cheng et al. |
| 7,486,221 | B2 | 2/2009 | Meyers et al. |
| 7,495,604 | B2 | 2/2009 | Yamano et al. |
| 7,515,091 | B2 | 4/2009 | Meyers et al. |
| 7,760,133 | B2 | 7/2010 | Shirai et al. |
| 7,940,743 | B2 * | 5/2011 | Seisenberger et al. ... H04L 7/06 370/350 |
| 7,978,123 | B2 | 7/2011 | Lam et al. |
| 8,031,690 | B2 * | 10/2011 | Aiello ............... H04W 56/0015 370/329 |
| 8,044,839 | B2 | 10/2011 | Sutphin |
| 8,559,554 | B2 | 10/2013 | Vossiek et al. |
| 8,730,088 | B2 | 5/2014 | Milligan et al. |
| 2005/0013389 | A1 | 1/2005 | Mizukami |
| 2005/0030935 | A1 | 2/2005 | Seisenberger et al. |
| 2005/0225481 | A1 | 10/2005 | Bonthron |
| 2006/0181448 | A1 | 8/2006 | Natsume et al. |
| 2007/0096885 | A1 | 5/2007 | Cheng et al. |
| 2007/0152871 | A1 | 7/2007 | Puglia |
| 2009/0243913 | A1 | 10/2009 | Sekiguchi et al. |
| 2009/0285313 | A1 * | 11/2009 | Vossiek et al. ....... G01S 13/765 375/259 |
| 2009/0309782 | A1 | 12/2009 | Takabayashi et al. |
| 2009/0309785 | A1 | 12/2009 | Nalezinski et al. |
| 2010/0073222 | A1 | 3/2010 | Mitomo et al. |
| 2012/0119938 | A1 | 5/2012 | Abe et al. |
| 2012/0188125 | A1 | 7/2012 | Pomietlasz |
| 2012/0268317 | A1 | 10/2012 | Himmelstoss et al. |
| 2012/0283987 | A1 | 11/2012 | Busking et al. |

OTHER PUBLICATIONS

Intent to Grant dated Jan. 2, 2017, from counterpart European Application No. 15176555.9-1812, 47 pp.
Blunt, "Radar-Embedded Communications," ITTC Radar Systems & Remote Sensing Lab (RSL), Information and Telecommunication Technology Center, University of Kansas, Apr. 2009, 14 pp.
Fan, "GALS Design Methodology Based on Pausible Clocking," Dissertation, University of Berlin, Jun. 31, 2013, 137 pp.
Minihold et al., "Introduction to Radar System and Component Tests: White Paper," Rohde & Schwarz, Aug. 2012, 29 pp.
Sit et al., "The OFDM Joint Radar-Communication System: An Overview," SPACOMM 2011, The Third International Conference on Advances in Satellite and Space Communications, IARIA, Apr. 2011, 6 pp.
Wang et al., "Performance Prediction of a Synchronized Link for Distributed Aerospace Wireless Systems," The Scientific World Journal, Jul. 2013, 10 pp.
Stelzer et al., "Precise Distance Measurement with Cooperative FMCW Radar Units," Radio and Wireless Symposium, IEEE, Jan. 2008, 4 pp.
Extended Search Report from counterpart European Application No. 15176555.9, dated Jan. 5, 2016, 8 pp.

* cited by examiner

FREQUENCY-MODULATED-CONTINUOUS-WAVE (FMCW) RADAR WITH TIMING SYNCHRONIZATION

This application claims the benefit of each of the following U.S. Provisional Applications, the entire contents of each of which is incorporated herein by reference:

U.S. Provisional Application Ser. No. 62/027,818, filed 23 Jul. 2014;

U.S. Provisional Application Ser. No. 62/028,768, filed 24 Jul. 2014.

TECHNICAL FIELD

This disclosure relates to radar systems and, more particularly, Frequency-Modulated-Continuous-Wave (FMCW) radar systems.

BACKGROUND

Frequency-Modulated-Continuous-Wave (FMCW) radar is a type of radar system where a known stable frequency, continuous wave varies up and down in frequency over a fixed period of time by a modulating signal. A frequency difference between the receive signal and the transmit signal increases with delay, and hence with distance. The radar system then mixes echoes from a target with the transmitted signal to produce a beat signal which will give the distance of the target after demodulation.

SUMMARY

Various examples are described below generally directed to methods, devices, and systems that enable a Frequency-Modulated-Continuous-Wave (FMCW) radar to have timing synchronization and data communication. The timing synchronization may be a synchronization of a clock in a single FMCW radar device to another clock or synchronization of clocks between two or more FMCW radar devices in a FMCW radar system. The data communication may be communication of data from a single FMCW radar device or communication of data between two or more FMCW radar devices in an FMCW radar system.

In one example, the disclosure is directed to a method of synchronizing clocks of Frequency-Modulated-Continuous-Wave (FMCW) radar units, by transmitting a first signal of a first FMCW radar unit, a frequency of the first signal varying over a first frequency range around a first baseband frequency, receiving a second signal at the first FMCW radar unit, a frequency of the second signal varying over a second frequency range around a second baseband frequency, determining values of a plurality of parameters including a first timing offset of the first FMCW radar unit based on a digital difference signal between the first and second signals, receiving a second timing offset of a second FMCW radar unit, determining a clock offset based on the first and second timing offsets, and synchronizing a clock of the first FMCW radar unit with a clock of the second FMCW radar unit based on the clock offset.

In another example, the disclosure is directed to a Frequency-Modulated-Continuous-Wave (FMCW) radar device comprising a clock to drive an oscillator, wherein the oscillator is configured to transmit a first signal from an RF antenna, and wherein a frequency of the first signal increases varies over a first frequency range around a first baseband frequency, a mixer configured to receive a second signal from the RF antenna and generate a difference signal based on the first signal and the second signal, wherein a frequency of the second signal varies over a second frequency range around a second baseband frequency, an analog-to-digital converter configured to generate a digital difference signal based on the difference signal generated by the mixer, and a signal processing unit. The signal processing unit is configured to determine values of a plurality of parameters including a first timing offset based on the digital difference signal, receive a second timing offset of a second FMCW radar unit, determine a clock offset based on the first and second timing offsets, and synchronize the clock with a clock of the second FMCW radar unit based on the clock offset.

In another example, the disclosure is directed to a system comprising a Frequency-Modulated-Continuous-Wave (FMCW) radar system, the system comprising a plurality of FMCW radar units. Each FMCW radar unit of the plurality of FMCW radar units comprising a clock configured to drive an oscillator, wherein the oscillator is configured to transmit a first signal from an RF antenna, and wherein a frequency of the first signal varies over a first frequency range around a first baseband frequency, a mixer configured to receive a second signal from the RF antenna and generate a difference signal based on the first signal and the second signal, wherein a frequency of the second signal varies over a second frequency range around a second baseband frequency, an analog-to-digital converter (ADC) configured to generate a digital difference signal based on the difference signal generated by the mixer, and a signal processing unit. The signal processing unit is configured to determine values of a plurality of parameters including a first timing offset based on the digital difference signal, receive a second timing offset, determine a clock offset based on the first and second timing offsets, and synchronize the clock with the clock offset.

The details of one or more examples described in this disclosure are set forth in the accompanying drawings and the description below. Other features, objects, and advantages of the techniques will be apparent from the description and drawings, and from the claims.

DETAILED DESCRIPTION

Various examples are described below generally directed to devices, integrated circuits, systems, and methods for a radar system that combines Frequency-Modulated Continuous-Wave (FMCW) radar with timing synchronization and data communication. This disclosure describes techniques for adding clock synchronization and data communication to platforms with existing FMCW radar. In general, the FMCW radar may be used to measure the range (e.g., distance) to objects in the field of view (such as terrain or other obstacles).

Techniques as described in this disclosure may allow a FMCW radar or two FMCW radars to synchronize their respective clocks to a high level of accuracy. For example, the clocks between the two FMCW radars may be synchronized down to 10 picoseconds (ps). Once the synchronization parameters of the two clocks are known, full-duplex communication using the FMCW radars may also be possible. In this manner, because the processing of the FMCW signals for synchronization and communication may be done using essentially the same signal path as the radar signal processing, the techniques of this disclosure may require no additional hardware in the two FMCW radars.

By not requiring additional hardware to perform the techniques of this disclosure, the techniques of this disclosure may potentially be implemented without adding weight or increasing power consumption. In this manner, small vehicles such as unmanned aerial systems (UAS), which do not have the capacity to carry multiple sensors to support navigation, surveillance, and communication may be able use the techniques of this disclosure without a decrease in system efficiency.

For ease of understanding, the techniques, devices, and systems of FIGS. 1-6 are described with respect to linear frequency modulation of FMCW signals; however, non-linear frequency modulation of the FMCW signals may also be applicable. In some examples, the non-linear frequency modulation of the FMCW signals may enable clock synchronization between radars.

Figure 1:
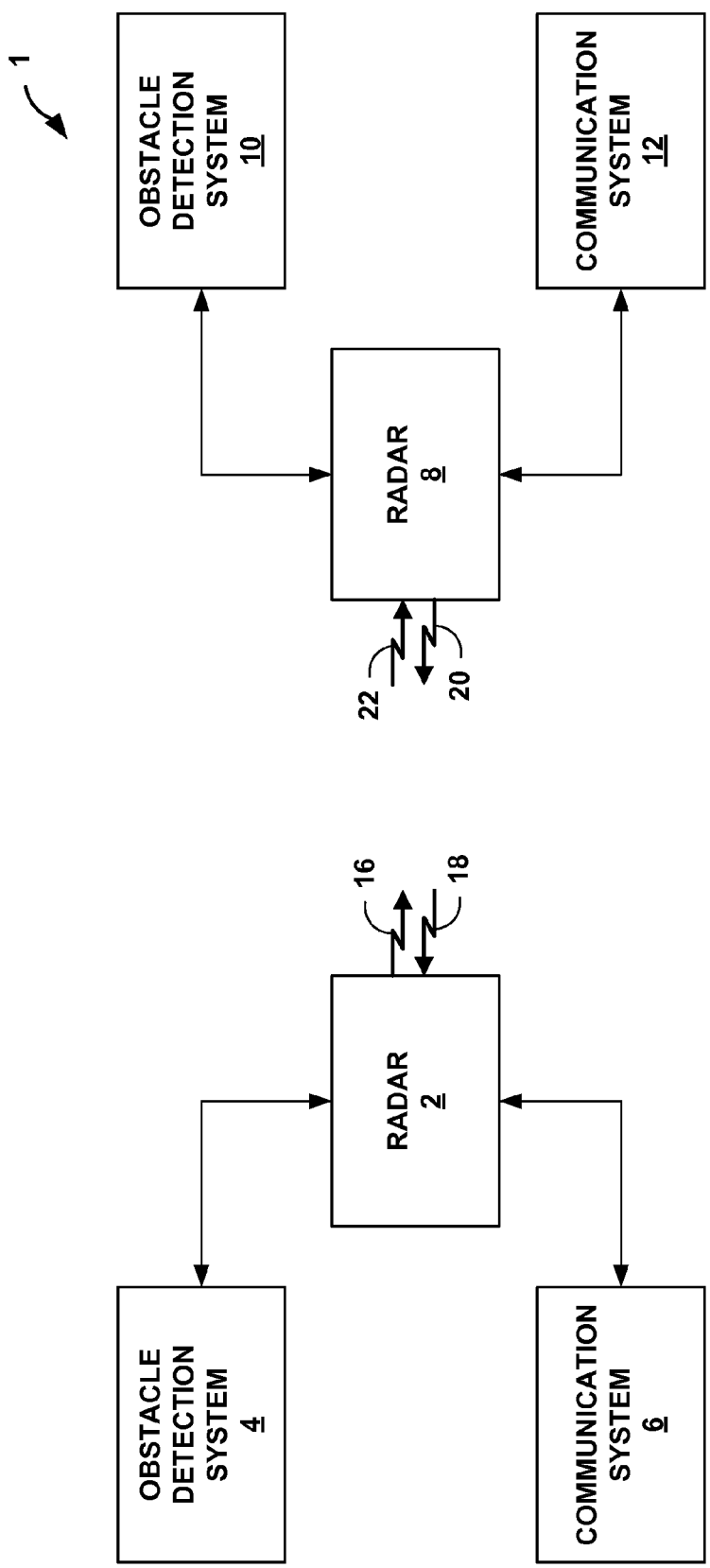
FIG. 1 illustrates a block diagram of an example Frequency-Modulated Continuous-Wave (FMCW) radar system with clock synchronization, in accordance with various aspects of this disclosure.

FIG. 1 illustrates a block diagram of example FMCW radar system 1 with clock synchronization, in accordance with various aspects of this disclosure. In the example of FIG. 1, FMCW radar system 1 incudes radars 2 and 8, obstacle detection systems 4 and 10, communication systems 6 and 12. Radars 2 and 8 may each be referred to as any of a "radar," "radar device," "radar unit," "radar system," or any other such term. Radars 2 and 8, collectively, may form FMCW radar system 1. In the example of FIG. 1, received signal 18 of radar 2 may be a reflected signal of transmitted signal 16 off a target or may be transmitted signal 20 of radar 8. In the example of FIG. 1, received signal 22 of radar 8 may be a reflected signal of transmitted signal 20 off a target or may be transmitted signal 16 of radar 2.

Radars 2 and 8 may be FMCW radars that transmit respective signals 16 and 20 to each other using the same frequency ramp parameters. In some examples, radars 2 and 8 may be configured to enable highly precise clock synchronization. Obstacle detection systems 4 and 10 may be configured to detect obstacles based on respective signals 18 and 22 received from radars 2 and 8. Communication system 6 and 12 may be configured to communicate data based on respective signals 16 and 20 transmitted and respective signals 18 and 22 received from radars 2 and 8.

Radars 2 and 8 may transmit signals 16 and 20 with a frequency that is either a linear or a non-linear ramp that is repeated over a short period of time (e.g., 1 millisecond (ms)). Equation 1 expresses the frequency of the transmitted signals 16 and 20.

$$f(t) = \begin{cases} f_b + f_1 t, & \text{for } t < T - t_b \\ f_b + f_1 \dfrac{T-t}{T}, & \text{for } T - t_b < t < T \end{cases} \quad (1)$$

In equation 1, $f_b$ is the baseband frequency, $f_1$ is the rate in megahertz per second (MHz/s) of the frequency ramp, T is the period of the repeated frequency ramp, and $t_b$ is the time for the added frequency to return to zero from the peak frequency. In one example of a FMCW radar according to FIG. 1, T may be 0.5 ms, and the linear or non-linear frequency ramp may have a peak frequency that may be 800 MHz above the baseband frequency.

Radars 2 and 8 may mix the received respective signals 18 and 22 from the target with the transmitted respective signals 16 and 20 with a mixer. The output of the mixer may be a beat signal (e.g., a difference signal), where the beat signal is the instantaneous difference of the transmitted respective signals 16 and 20 and received respective signals 18 and 22. As the received respective signals 18 and 22 may have to travel to the target and back, the received respective signals 18 and 22 may have a time delay of 2d divided by c, where d is the distance to the target and c is the speed of light. The output of the mixer may be a difference signal with a single frequency corresponding to the difference in the two frequency ramps as described with respect to FIG. 3. In some examples, an analog-to-digital converter (ADC) may sample the difference signal and generate a digital difference signal, which the ADC may output to a signal processing unit. Sampling the difference signal using an ADC at an appropriate rate may allow measurement of the frequency using a simple Fast Fourier Transform (FFT). In this way, the peaks in the output of the FFT correspond to reflections from the targets. In other words, the FFT may represent the matched filter that optimally maximizes the signal-to-noise ratio (SNR) of the output of the mixer.

In the example of FIG. 1, where radars 2 and 8 may be transmitting respective signals 16 and 20 to each other using the same frequency ramp parameters. Radars 2 and 8 may be at a distance from each other, such that receiving respective signals 18 and 22 may each have the same time delay (e.g., "time-of-flight delay").

Figure 4:
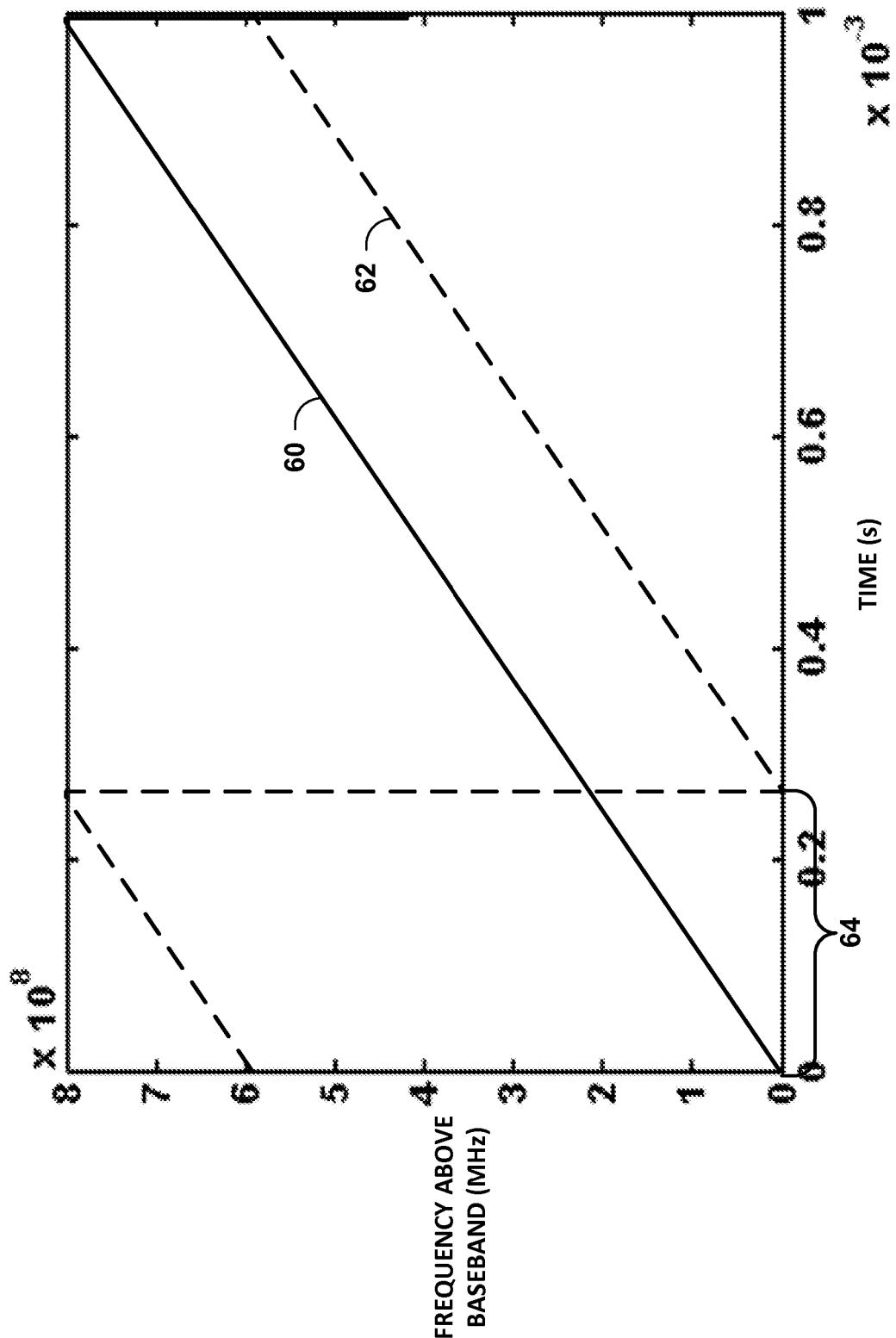
FIG. 4 illustrates a graph of another example time-of-flight delay between a transmitted signal from a first radar and a transmitted signal from a second radar, in accordance with various aspects of this disclosure.

In addition to the time-of-flight delay, the respective clocks of radars 2 and 8 may not be synchronized. The desynchronization of the respective clocks between radars 2 and 8 may add to the time-of-flight delay for one of radars 2 and 8, but subtracts from the time-of-flight delay for the other radar, as is shown in FIG. 4. In some examples, the respective time-of-flight delays between transmitted respective signals 16 and 20 and the received respective signals 18 and 22 may be measured by radars 2 and 8, and information of the respective time-of-flight delays exchanged, the difference of the respective time-of-flight delays may be twice the clock offset, $\Delta t$.

In addition to the respective time-of-flight delays, received respective signals 18 and 22 may also be impacted by Doppler effects. For example, radars 2 and 8 may be located on two separate platforms, which may be moving with respect to each other, and respective signals 18 and 22 received by radars 2 and 8 may be Doppler-shifted. In other words, if the relative velocity between radars 2 and 8 is v, then the actual frequency $f_r$ of received respective signals 18 and 22 may be the square root of beta plus one divided beta minus one, as shown in equation 2, times the frequency $f_t$ of transmitted respective signals 16 and 20, where beta equals v divided by c, as shown in equation 3.

$$\sqrt{\frac{1+\beta}{1-\beta}} \quad (2)$$

$$\beta = \frac{v}{c} \quad (3)$$

The Doppler frequency shift affects not only the frequency ramp, but also the baseband frequency.

In addition to the respective time-of-flight delays, transmitted respective signals 16 and 20 may also be impacted by clock skew. For example, clock skew may occur when the rate of the respective clocks of radars 2 and 8 may not be the same. In some examples, when the frequency ramp may be non-linear, then the rate of frequency change in the ramp may appear to be different between transmitted respective signals 16 and 20. In some examples, clock skew may be expressed by α, such that the period of time T on one radar of radars 2 and 8 may be (1+α)T on the other radar. Additionally, transmitted respective signals 16 and 20 may also be impacted by differences in the respective baseband frequencies. The respective baseband frequencies may be derived from the respective clocks of radars 2 and 8, and the clock skew of the respective clocks of radars 2 and 8 may cause a different in the respective baseband frequencies of radars 2 and 8.

In the example of FIG. 1, the output of the mixer may be sampled by the ADC, which may measure the signal at times $t_i$, where $t_i$ refers to the time at which the $i^{th}$ sample is measured by the ADC, or $t_i = i*\delta t$. In this example, the first measurement by the ADC may be offset from the start of the frequency sweep by an amount $\Delta \tau$.

In the example of FIG. 1, the distance between radars 2 and 8 may not be constant, as radars 2 and 8 may be moving relative to each other. In this example, the time-of-flight delay of received respective signals 18 and 22 may not be constant over the length of a frequency sweep. In other words, the distance between radars 2 and 8 at the start of a frequency sweep may be expressed as d, and the distance during the frequency sweep may be approximated by equation 4, and the time-of-flight delay may be expressed by equation 5.

$$(d + vt_i) \quad (4)$$

$$\left(\frac{d}{c} + \beta t_i\right) \quad (5)$$

In the example of FIG. 1, where the frequency sweep is expressed as R(t), then the frequency (e.g., $f_t$) that radars 2 and 8 may transmit may be $R(t)+f_b$. In some examples, the time at the ith ADC sample may be expressed as Equation 6, where δt is the sampling time step of the ADC. In these examples, the transmitted frequency (e.g., $f_t$) at time $t_i$ may be expressed as Equation 7. In these examples, the received frequency (e.g., $f_r$) at the ith ADC sample may be expressed as Equation 8.

$$i \cdot \delta t + \Delta \tau = t_i + \Delta \tau \quad (6)$$

$$f_t = R(t_i + \Delta \tau) + f_b \quad (7)$$

$$f_r = \sqrt{\frac{1+\beta}{1-\beta}} \left[ R\left\{(1+\alpha)(t_i + \Delta \tau) + \frac{d}{c} + \beta(t_i + \Delta \tau) + \Delta t\right\} + \frac{f_b}{1+\alpha} \right] \quad (8)$$

In this way both the transmitted frequency (e.g., $f_t$) and the received frequency (e.g., $f_r$) may be expressed as a function of time (e.g., ADC sampling), and the calculated output of the ADC at time $t_i$ may be expressed as Equation 9, where the overall phase difference is θ.

$$O_i = \cos\{2\pi i(t_i + \Delta \tau)[f_t - f_r] + \theta\} \quad (9)$$

In the example of FIG. 1, radars 2 and 8 may be able to determine the value for each parameter. For example, radars 2 and 8 may be to determine the value for β, α, Δτ, and $$\frac{d}{c} + \Delta t.$$

The ADC may sample at a high rate (e.g., 100 Mega Samples per second (MSps)). In some examples, a subsampling of the ADC at a lower rate may be used by radars 2 and 8 for a determination of the parameters. For example, radars 2 and 8 may use a subsampling of the ADC at 10 MHz, which may be sufficient to extract the values of the parameters. In these examples, an error function E (e.g., "the optimization function") may be maximized at the correct values of the parameters, which may be expressed as Equation 10, where $O_{mi}$ may be the actual output (e.g. the measured output) of the ADC at time $t_i$.

$$E = \Sigma_i O_{mi} O_i \quad (10)$$

The optimization of the error function as expressed by Equation 10 may construct the matched filter for the output of the ADC. For example, for a linear frequency ramp, with no Doppler effects, no clock skew, and no ADC time offset (Δτ), the matched filter may be functionally equivalent to using the FFT. In this way, a simple search over all of the possible values of the parameters may be performed. In some examples, the simple search may be time-consuming and not practical for a real-time system. In some examples, the simple search may be reduced to a series of one-dimensional searches over one parameter at a time, which may be done by selecting appropriate subsets of the full ADC sample.

In other words, the full output of the ADC may not need to be used for the optimization, but rather only a subsample of the ADC may be used. In these examples, with respect to the FFT, by using only a subsample of the ADC may lead to aliasing issues due to Nyquist, a misidentification of the proper frequency, and the proper time offset. For example, where the frequency sweep may not be a linear frequency ramp, but some function such as a cosine, then there may be an infinite number of frequencies in the output signal and aliasing may be impossible. In this example, where the frequency may not be a linear frequency ramp, the timing offset as expressed by Equation 11 and determined by Equation 10 (e.g., the optimization function) may then be unique.

$$\frac{d}{c} + \Delta t \quad (11)$$

In other words, the clock offset and the timing offset may be parameters with values determined from measurements of radars 2 and 8. For example, radar 2 and 8 may construct a model of received signal 18 or 22 as a function of those parameters as described in Equation 9. Upon determining the maximum of the optimization function (e.g., Equation 10) (as a function of the parameters such as the clocking offset and the timing offset), then radars 2 and 8 may determine the values of the timing offset and clock offset parameters. The model of received signal 18 and/or 22 as described in Equation 9 with the values of the parameters found from the optimization of the function as described in Equation 10 is the matched filter for the signal from the output of the mixer.

In some examples, the width of the peak of the optimization function may be determined by the bandwidth of the frequency sweep. In these examples, the precision of the extracted parameters may also be determined by the bandwidth of the frequency sweep. In some examples, where frequency sweep bandwidths may be 800 MHz, radars 2 and 8 may be able to determine the timing offset, as expressed by Equation 11, to within 10 ps or less. In these examples, the optimized function may be the matched filter for received respective signals 18 and 22, and the output SNR is therefore maximized. For example, simulations confirm the timing offset to be less than 10 ps.

In some examples, radars 2 and 8 may determine the match filter parameters for the first processed frequency sweep by choosing appropriate subsamples of the ADC output. In these examples, by choosing the appropriate subsamples, radars 2 and 8 may search for the parameters in a series of 1-dimensional searches combined with local optimization. For example, radars 2 and 8 may use the first one thousand and twenty forty samples of the full ADC output, which may allow radars 2 and 8 to perform a search for the timing offset, as expressed by Equation 11, without first determining the other parameters. In other words, the effects of α, β, and the baseband frequency difference on the output of the matched filter are proportional to t. In this way, at close to the start of the local frequency sweep (e.g., when the time value oft is very low), the effects of α, β, and the baseband frequency difference may have little impact on the output of the matched filter. In addition, radars 2 and 8 may use the same sample of the ADC output to perform a search for a baseband frequency, which may determine an approximate value for the baseband frequency. After determining an approximate value for the baseband frequency, in some examples, radars 2 and 8 may perform a local optimization using the first and second derivatives, which may be carried out using all of the parameters, but using a different subsample of the output of the ADC. In these examples, the different subsample may include samples from the entire output range over the period of the frequency sweep so that the sensitivity to the various parameters is maximized. For example, the optimization problem may be a global problem which may be done by a simple search over all possible values of the parameters including searching through five dimensions. In another example, the global optimization may be performed by reducing the global problem to a couple of one-dimensional or two-dimensional searches over one or two of the parameters, followed by a local optimization. In some examples, the local optimization may only find the local maximum closest to the starting point, but is easy to do using first and second derivatives.

In other words, radars 2 and 8 may determine the global maximum of the optimization function as radars 2 and 8 vary the parameters over all possible values. In some examples, however, in order to reduce the amount of time required, radars 2 and 8 may determine a local maximum instead of a global maximum. The local maximum may be a value of the optimization function that is larger than any other value of the optimization function over a small range of the possible parameter values. In this manner, less time may be required to find the local maxima, as compared to the time required to find a global maximum, because radars 2 and 8 may calculate how the optimization function changes when radars 2 and 8 change the values of the parameters slightly to determine the slope of the optimization function. Radars 2 and 8 may use the slope of the optimization function to move in a direction that will increase the value of the optimization function (e.g., when radars 2 and 8 calculate the first and second derivatives of the optimization function). The difference between a local maximum and the global maximum is the difference between the maximum of a subsample of the full ADC output and the maximum of the full ADC output. In some examples, radars 2 and 8 may determine the local maximum in less time than the global maximum using the slope and the first and second derivatives. In these examples, the local maximum determined by radars 2 and 8 may be practical for communication systems 6 and 12 operating in real time.

In some examples, radars 2 and 8 may determine a combination of the time-of-flight delay and the clock offset, as expressed by Equation 11, and the results may be exchanged with each other as data using a communication channel. In some examples, the communication channel may be separate from radars 2 and 8. In other examples, the communication channel may be part of radars 2 and 8, and the data may be part of transmitted respective signals 16 and 20 and received respective signals 18 and 22.

In some examples, when radars 2 and 8 are stationary with respect to each other, relative velocity, β, may also be equal to zero. In some examples, where the distance between radars 2 and 8 may be changing, the timing offset that is measured by one radar of radars 2 and 8 may include a first distance $d_1$ that is measured at a different time than the same timing offset measured by the other radar at a distance $d_2$. The difference in time between the two measurements may be just Δt, so the distance between radars 2 and 8 may be at a time Δt and expressed as Equation 12.

$$d - \beta c \Delta t \quad (12)$$

In this manner, when radars 2 and 8 exchange the timing offset that has determined by each radar, radars 2 and 8 may modify the clock offset based on the timing offsets of the first and second radars. For example, a first radar may determine (e.g., extract) locally a first timing offset, as expressed as Equation 13, and a second radar may determine and send a second timing offset, which may be received by the first radar, as expressed as Equation 14. In this example, the clock offset may be expressed as Equation 15, where the clock offset is the difference between the first and second timing offsets.

$$t_D = \frac{d}{c} + \Delta t \quad (13)$$

$$t_R = \frac{d}{c} - \beta\Delta t - \Delta t \quad (14)$$

$$\Delta t_O = \frac{(t_D - t_R)}{2 + \beta} \quad (15)$$

In some examples, Equation 15 may use the value of β extracted from the optimization as described above. In these examples, the precision of the value of β is such that βT may be 10 picosecond (ps), where T is the period of the frequency sweep. In this way, the timing offsets may be less than T, thus making the uncertainty in the clock offset, Δt due to β may be less than 10 ps.

In some examples, the optimization may be repeated for each subsequent frequency sweep, and the evolution of the matched filter over time may be determined. In some examples, the distance d may be extrapolated using the extracted β, and the clock offset may grow by an amount equal to the clock skew times the period of the frequency sweep, as expressed in Equation 16.

$$\Delta t_{N+1} = \Delta t_N + \alpha T \quad (16)$$

The values of the other parameters may not change significantly from sweep to sweep. In some examples, radars 2 and 8 may determine that the other parameters have significantly changed. In these examples, radars 2 and 8 may again perform the optimization in order to determine the significant changes in the other parameters.

Figure 2:
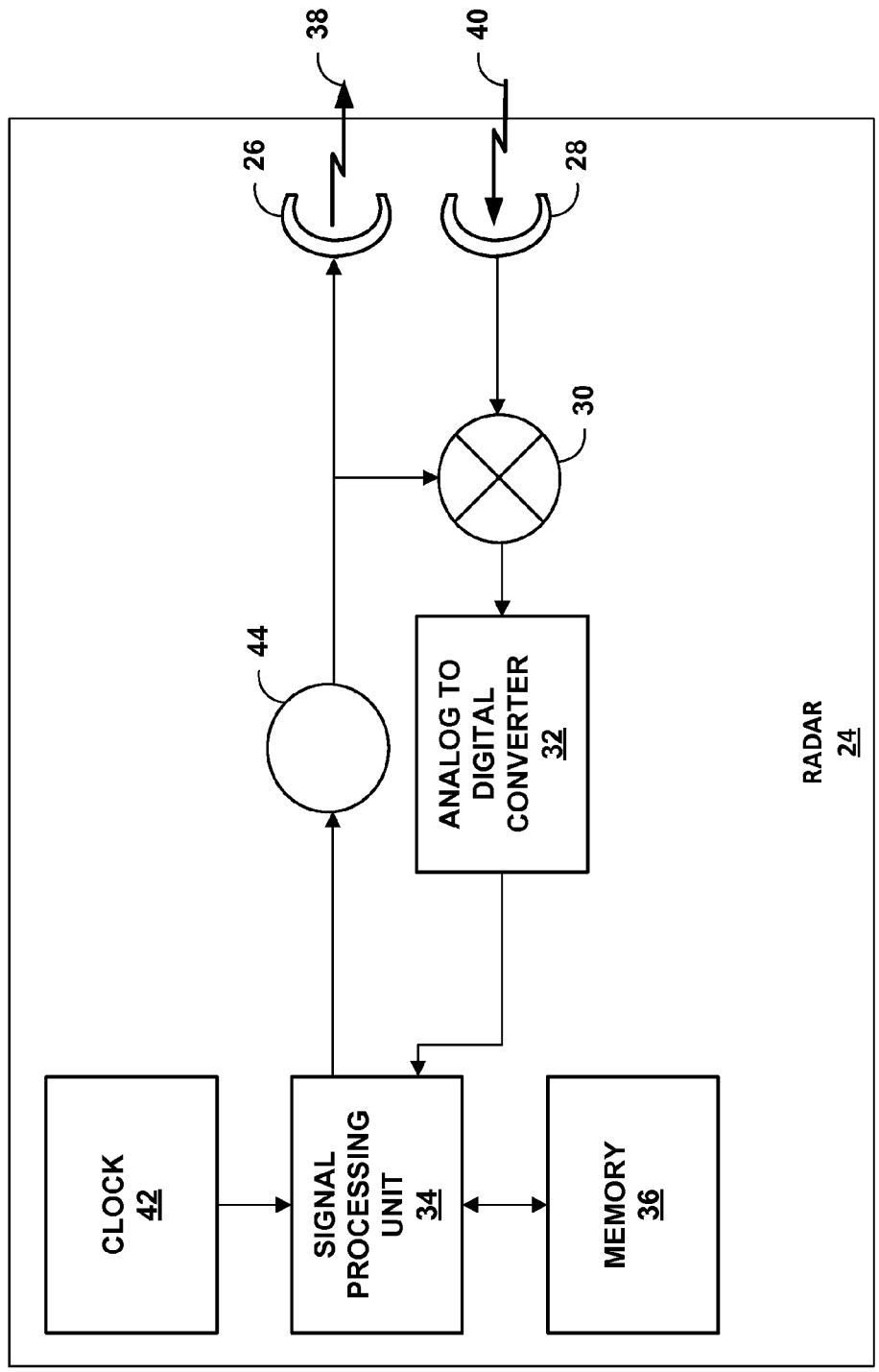
FIG. 2 illustrates a block diagram of an example radar system that determines the offset between a transmitted signal and a received signal, in accordance with various aspects of this disclosure.

FIG. 2 illustrates a block diagram of an example radar 24radar 24 that determines the offset between a transmitted signal and a received signal, in accordance with various aspects of this disclosure. FIG. 2 is described with reference to FIG. 1. FIG. 2 is also described with respect to radar 2; however, it should be understood that the techniques described in FIG. 2 may also apply to radar 8.

In the example of FIG. 2, radar 24radar 24, which may correspond to radar 2, and may include signal processing unit 34, transmitter 44, transmit antenna 26, receive antenna 28, mixer 30, ADC 32, clock 42, and memory 36. In the example of FIG. 2, radar 24radar 24 may be configured to transmit signal 38 and receive signal 40, which may generally correspond to transmit signal 16 and receive signal 18 described with respect to FIG. 1.

Signal processing unit 34 may, for example, be a circuit configured to control transmitter 44. Signal processing unit 34 may comprise any suitable arrangement of hardware, software, firmware, or any combination thereof, to perform the techniques attributed to the signal processing unit 34 herein. For example, signal processing unit 34 may include any one or more microprocessors, digital signal processors (DSPs), application specific integrated circuits (ASICs), field programmable gate arrays (FPGAs), programmable logic device (PLD), or any other equivalent integrated or discrete logic circuitry, as well as any combinations of such components.

Transmitter 44 may, for example, be a circuit configured to generate an RF signal with either a linear or a non-linear frequency ramp. Transmitter 44 may include, but not limited to, a voltage controlled oscillator, or any other component capable of generating an RF signal with either a linear or a non-linear frequency ramp.

Transmit antenna 26 may be any form of antenna capable of transmitting an RF signal to another source, for example but not limited to, a directional antenna or an omni-directional antenna. Receive antenna 28 may be any form of antenna capable of receiving an RF signal from another source, for example but not limited to, a directional antenna or an omni-directional antenna. In some examples, transmit antenna 26 and receive antenna 28 may be the same antenna.

Mixer 30 combines transmit signal 38 with received signal 40 to create a beat signal output, and sends the beat signal output to ADC 32. ADC 32 performs a digital conversion and sending the digitized beat signal to signal processing unit 34. Signal processing unit 34 transforms the digital beat signal to the frequency domain. Signal processing unit 34 then generates an output that is sent to an output device for presentation.

Clock 42 may, for example, be a circuit configured to generate and provide a baseband frequency to signal processing unit 34. Memory 36 is configured to store data and/or instructions and may, for example, include random access memory (RAM) integrated circuits, cache circuits, and/or one or more volatile or non-volatile data storage devices. Memory 36 may also include one or more devices or systems (e.g., hard drives, solid state drives) that may function or be used as either long-term data storage and/or short-term memory. For example, memory 36 may be configured to store clock synchronization instructions, which upon execution, may synchronize the clocks of two or more radars.

Radar 24 may be a FMCW radar that transmits signal 38 to another radar system using the same frequency ramp parameters. In some examples, radar 24 may be configured to enable highly precise clock synchronization.

In some examples, radar 24 may transmit signal 38 with a frequency that may be either a linear or a non-linear ramp that is repeated over a short period of time (e.g., one millisecond). For example, Equation 1 may express the frequency of the transmitted signal 38.

The transmitted signal 38 from radar 24 may be reflected from a target, and radar 24 may receive the reflected signal as received signal 40. Radar 24 may mix the received signal 40 from the target with the transmitted signal 38 with mixer 30. The output of mixer 30 may be a beat signal (e.g., a difference signal), where the beat signal may be the instantaneous difference of transmitted signal 38 and received signal 40. In some examples, the output of mixer 30 may be a difference signal with a single frequency corresponding to the difference between the frequency ramps of transmitted signal 38 and received signal 40. In some examples, ADC 32 may sample the difference signal and generate a digital difference signal, which ADC 32 may output to signal processing unit 34. Sampling the mixed signal using ADC 32 at an appropriate rate may allow measurement of the frequency using a simple FFT. In this way, the peaks in the output of the FFT correspond to reflections from the targets. In other words, the FFT may represent the matched filter that optimally maximizes the SNR of the output of the mixer.

In the example of FIG. 2, radar 24 may be transmitting signal 38 to another radar system using the same frequency ramp parameters. Radar 24 may be at a distance from the other radar system, such that received signal 40 may have a time delay (e.g., "time-of-flight delay") when compared to transmitted signal 38.

In addition to the time-of-flight delay, clock 42 of radar 24 may not be synchronous with the clock of the other radar system. The de-synchronization of clock 42 with the clock of the other radar system may add to the time-of-flight delay for one of the two radars, but subtracts from the time-of-flight delay for the other radar, as described in FIGS. 5 and 6. In some examples, the time-of-flight delay between received signal 40 and the transmitted signals 38 may be measured by radar 24, information of the time-of-flight delay exchanged, and the difference between the time-of-flight delay of radar 24 and the time-of-flight delay of the other radar system may be twice the clock offset, Δt.

In addition to the time-of-flight delays of radar 24, received signal 40 may also be impacted by Doppler effects. For example, radar 24 and another radar system may be located on two separate platforms, which may be moving with respect to each other, and signal 40 received by radar 24 may be Doppler-shifted as described in FIG. 1. The Doppler frequency shift affects not only the frequency ramp, but also the baseband frequency of signal 40.

In addition to the time-of-flight delay, transmitted signal 38 may also be impacted by clock skew. For example, clock skew may occur when the rate of clock 42 of radar 24 and the rate of the clock of the other radar system may not be the same. In some examples, clock skew may be expressed by α, such that the period of time T on one radar of radars 2 and 8 may be (1+α)T. In the example of FIG. 2, the output of mixer 30 may be sampled by ADC 32, which may measure the signal strength at equally spaced times $t_i$. In this example, the first measurement by ADC 32 may be offset from the start of the frequency sweep by an amount Δτ.

In the example of FIG. 2, the distance between radar 24 and another radar system may not be constant, as radar 24 and the other radar system may be moving relative to each other. In this example, the time-of-flight delay of received signal 40 may not be constant over the length of a frequency sweep. In other words, the distance between radar 24 and the other radar system at the start of a frequency sweep may be expressed as d, and the distance during the frequency sweep may be approximated by equation 4, and the time-of-flight delay may be expressed by equation 5.

In the example of FIG. 2, where the frequency sweep is expressed as R(t), then the frequency (e.g., $f_t$) that radar 24 and the other radar system may transmit may be R(t)+$f_b$. In some examples, the time at the ith ADC sample of ADC 32 may be expressed as Equation 6, where δt is the sampling time step of ADC 32 as described in FIG. 1. In these examples, the transmitted frequency (e.g., $f_t$) at time $t_i$ may be expressed as Equation 7 as described in FIG. 1. In these examples, the received frequency (e.g., $f_r$) at the ith ADC sample of ADC 32 may be expressed as Equation 8 as described in FIG. 1.

In this way both the transmitted frequency (e.g., $f_t$) and the received frequency (e.g., $f_r$) may be expressed as a function of time (e.g., ADC sampling), and the output of ADC 32 at time $t_i$ may be expressed as Equation 9, where the overall phase difference is θ as described in FIG. 1.

In the example of FIG. 2, signal processing unit 34 of radar 24 may be able to determine the value for each parameter. For example, radar 24 may be to determine the value for β, α, Δτ, and $$\frac{d}{c} + \Delta t.$$

ADC 32 may sample at a high rate (e.g., 100 MSps). In some examples, a subsampling of ADC 32 at a lower rate may be used by radar 24 and the other radar system for a determination of the parameters. For example, radar 24 and the other radar system may use a subsampling of ADC 32 at 10 MHz, which may be sufficient to extract the values of the parameters. In these examples, an error function E may be maximized at the correct values of the parameters, which may be expressed as Equation 10, where $O_{mi}$ may be the actual output of the ADC at time $t_i$, as described in FIG. 1.

The optimization by signal processing unit 34 of the error function as expressed by Equation 10 may construct the matched filter for the output of ADC 32. For example, for a linear frequency ramp, with no Doppler effects, no clock skew, and no ADC time offset (Δτ), the matched filter created by signal processing unit 34 may be reduced to the FFT.

In some examples, the full output of ADC 32 may not be used for the optimization, but rather only a subsample of ADC 32. In these examples, with respect to the FFT, by using only a subsample of ADC 32 may lead to aliasing issues due to Nyquist, a misidentification of the proper frequency, and the proper time offset. For example, where the frequency sweep may not be a linear frequency ramp, but some function such as a cosine, then there may be an infinite number of frequencies in the output signal and aliasing may be impossible. In this example, where the frequency sweep may not be a linear frequency ramp, the timing offset as expressed by Equation 11 as described in FIG. 1 and determined by signal processing unit 34 using Equation 10 (e.g., the optimization function) may then be unique.

In some examples, signal processing unit 34 may use the bandwidth of the frequency sweep to determine the width of the peak of the optimization function. In these examples, signal processing unit 34 may also use the bandwidth of the frequency sweep to determine the precision of the extracted parameters. In some examples, where signal processing unit 34 may use frequency sweep bandwidths around approximately 800 MHz, radar 24 and the other radar system may be able to determine the timing offset, as expressed by Equation 11, to within 10 picoseconds (ps) or less.

In some examples, signal processing unit 34 of radar 24 may determine the match filter parameters for the first processed frequency sweep by choosing appropriate subsamples of the output of ADC 32. In these examples, by choosing the appropriate subsamples, signal processing unit 34 of radar 24 may search for the parameters in a series of 1-dimensional searches combined with local optimization. For example, signal processing unit 34 may use the first one thousand and twenty forty samples of the full output of ADC 32, which may allow radar 24 to perform a search for the timing offset, as expressed by Equation 11, without first determining the other parameters. In other words, the effects of α, β, and the baseband frequency difference on the output of the matched filter are proportional to t. In this way, at close to the start of the local frequency sweep (e.g., when the time value of t is very low), the effects of α, β, and the baseband frequency difference may have little impact on the output of the matched filter.

In addition, signal processing unit 34 of radar 24 may use the same sample of the ADC output to perform a search for a baseband frequency, which may determine an approximate value for the baseband frequency. After determining an approximate value for the baseband frequency, in some examples, signal processing unit 34 may perform a local optimization using the first and second derivatives, which may be carried out using all of the parameters, but using a different subsample of the output of ADC 32. In these examples, the different subsample may include samples from the entire output range over the period of the frequency sweep so that the sensitivity to the various parameters is maximized.

In some examples, signal processing unit 34 of radar 24 may determine a combination of the time-of-flight delay and the clock offset, as expressed by Equation 11, and the results may be exchanged with the other radar system as data using a communication channel. In some examples, the communication channel may be part of radar 24, and the data may be part of transmitted signal 38 and received signal 40.

In some examples, where the distance between radar 24 and the other radar system may be changing, the timing offset that is measured by radar 24 may include a first distance $d_1$ that is measured at a different time than the same timing offset measured by the other radar system at a distance $d_2$. The difference in time between the two measurements may be just $\Delta t$, so the distance between radar 24 and the other radar system may be at a time $\Delta t$ and expressed as Equation 12.

In this manner, in some examples, when radar 24 receives the timing offset that has been determined by the other radar, radar 24 may modify the clock offset based on the timing offset of radar 24 and the timing offset of the other radar. For example, radar 24 may extract locally a first timing offset, as expressed as Equation 13 as described in FIG. 1. In some examples, the other radar may also send a second timing offset to radar 24, as expressed as Equation 14 as described in FIG. 1. In this example, the clock offset between radar 24 and the other radar may be expressed as Equation 15 as described in FIG. 1. In some examples, radar 24 may use the clock offset to synchronize clock 42 with the clock of the other radar. In this way, clock 42 may be synchronized with the clock of the other radar to within 10 picoseconds.

In this manner, in some examples, when radar 24 transmits and the other radar system receives the timing offset that has been determined by signal processing unit 34, the other radar system may modify the clock offset of the other radar based on the determined timing offset of radar 24. For example, the other radar may extract locally a first timing offset, as expressed as Equation 13 as described in FIG. 1. In some examples, radar 24 may also send a second timing offset to the other radar, as expressed as Equation 14 as described in FIG. 1. In this example, the clock offset between radar 24 and the other radar may be expressed as Equation 15 as described in FIG. 1. In some examples, the other radar may use the clock offset to synchronize the clock of the other radar with clock 42 of radar 24. In this way, the clock of the other radar may be synchronized with clock 42 of radar 24 to within 10 picoseconds.

In some examples, signal processing unit 34 may be configured to determine the values of a plurality of parameters including the first timing offset based on the digital difference signal. In these examples, signal processing unit 34 may be further configured to select a first subsample of a total sample of the digital difference signal. For instance, wherein the first subsample may be less than the total sample, signal processing unit 34 may determine a value of a first parameter of the plurality of parameters by performing a one-dimensional search of the first subsample, the first subsample selected such that the effects of the other parameters of the plurality of parameters on the first subsample are small compared to the effect of the first parameter on the first subsample. In some examples, the first parameter may be the first timing offset. In these examples, signal processing unit 34 may be further configured to responsive to determining the value of the first parameter, determine a value of a second parameter of the plurality of parameters by performing a second one-dimensional search of the first subsample. In these examples, the second parameter may be a second baseband frequency of the other radar unit (e.g., radar 8 as described in FIG. 1). In these examples, signal processing unit 34 may be further configured to responsive to determining the values of the first and second parameters, select a second subsample of the total sample of the digital difference signal, wherein the second subsample is less than the total sample, and determine values of remaining parameters of the plurality of parameters by a local optimization of first and second derivatives.

In some examples, signal processing unit 34 may be configured to transmit data by generating phase bits at regular intervals in the first signal. In some examples, the signal processing unit 34 may be configured to communicate data with another FMCW radar unit by generating phase bits at regular intervals in the first signal and determining phase bits of the second signal by a product of the calculated output of the ADC and the actual output of the ADC.

Figure 3:
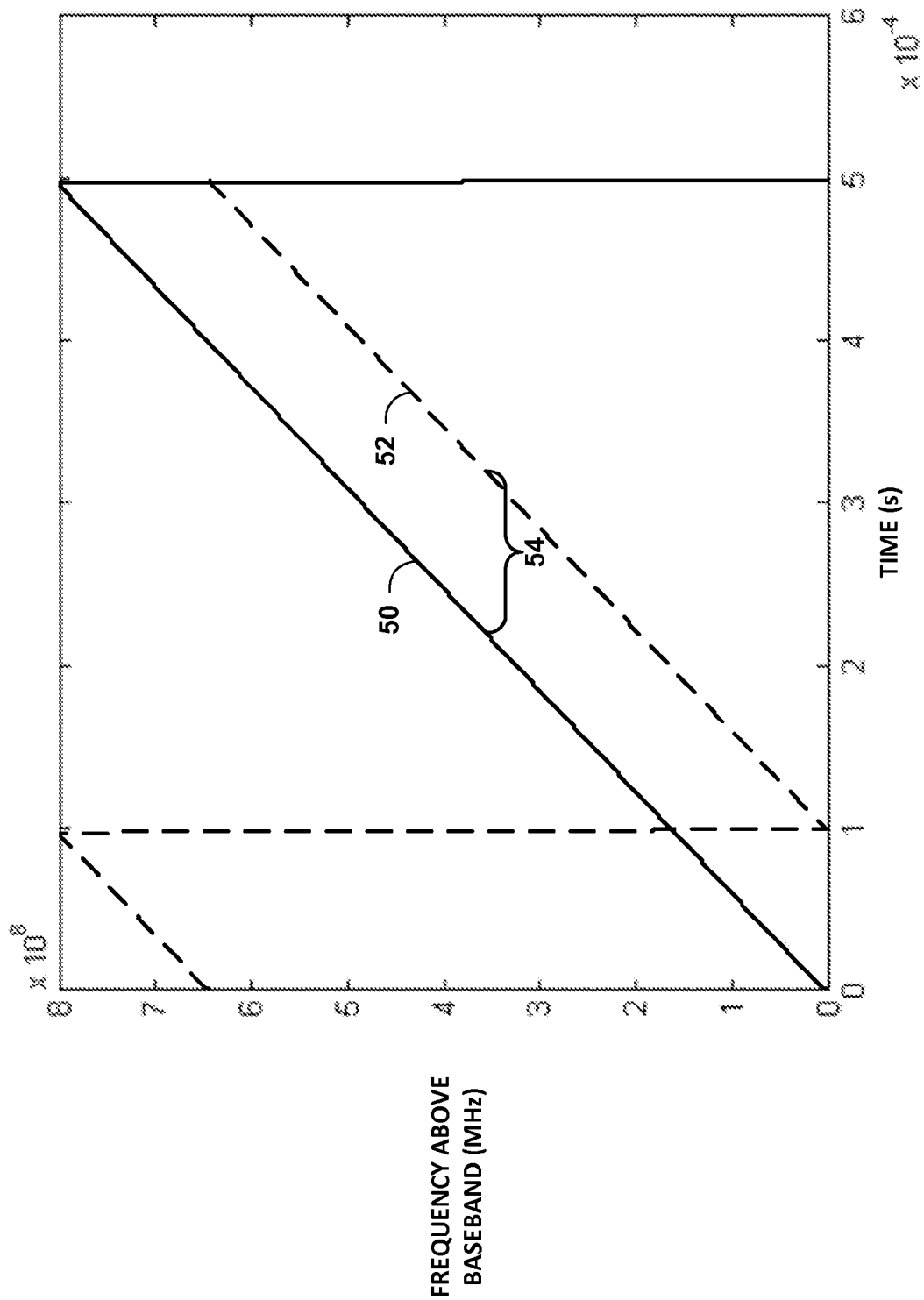
FIG. 3 illustrates a graph of an example time-of-flight delay between a transmitted FMCW signal and a received FMCW signal, in accordance with various aspects of this disclosure.

FIG. 3 illustrates a graph of an example time-of-flight delay 54 between transmitted FMCW signal 50 and received FMCW signal 52, in accordance with various aspects of this disclosure. FIG. 3 is described with reference to FIG. 1. In addition, FIG. 3 is described with respect to radar 2; however, the techniques described in FIG. 3 may also apply to radar 8.

For ease of understanding, FIG. 3 is described with respect to linear frequency modulation of FMCW signals; however, non-linear frequency modulation of the FMCW signals may also be applicable. In some examples, the non-linear frequency modulation of the FMCW signals may enable clock synchronization between radars 2 and 8.

In the example of FIG. 3, transmitted signal 50 may correspond to transmitted signal 16 from radar 2 as described in FIG. 1. In the example of FIG. 3, receive signal 52 may correspond to received signal 18 at radar 2 as described in FIG. 1. In the example of FIG. 3, time-of-flight delay 54 may correspond to the time-of-flight delay between transmitted signal 16 and received signal 18 as described in FIG. 1.

Transmitted signal 50 may be transmitted by radar 2 with either a linear or a non-linear frequency ramp from a baseband frequency to a peak of approximately 800 MHz above the baseband frequency. Received signal 52 may be received by radar 2 with either a linear or a non-linear frequency ramp from a baseband frequency to a peak of approximately 800 MHz above the baseband frequency. In some examples, received signal 52 may be a reflection of transmitted signal 50 off a target at a distance of 15 kilometers. Time-of-flight delay 54 may be the amount of time from transmitting signal 50 from radar 2 to receiving signal 52 at radar 2. In some examples, where the target is at a distance of 30 km, time-of-flight delay may be 0.0001 seconds.

FIG. 4 illustrates a graph of another example time-of-flight delay 64 between transmitted signal 60 from a first radar and transmitted signal 62 from a second radar, in accordance with various aspects of this disclosure. FIG. 4 is described with reference to FIG. 1.

For ease of understanding, FIG. 4 is described with respect to linear frequency modulation of FMCW signals; however, non-linear frequency modulation of the FMCW signals may also be applicable. In some examples, the non-linear frequency modulation of the FMCW signals may enable clock synchronization between radars 2 and 8.

In the example of FIG. 4, signal 60 may correspond to transmitted signal 16 from radar 2 as described in FIG. 1. In the example of FIG. 4, signal 62 may correspond to transmitted signal 20 from radar 8 as described in FIG. 1. In the example of FIG. 4, time-of-flight delay 64 may correspond to the time-of-flight delay between transmitted respective signals 16 and 20 and received respective signals 18 and 22 as described in FIG. 1.

In the example of FIG. 4, radars 2 and 8 may be at some distance from each other. In some examples, radars 2 and 8 may be 84 kilometers from each other. The distance between radars 2 and 8 may delay (e.g., time-of-flight delay 64) signals 60 and 62 from being received at radars 2 and 8, respectively. In the example of FIG. 4, time-of-flight delay 64 between signals 60 and 62 may be approximately 0.00028 seconds.

Figure 5:
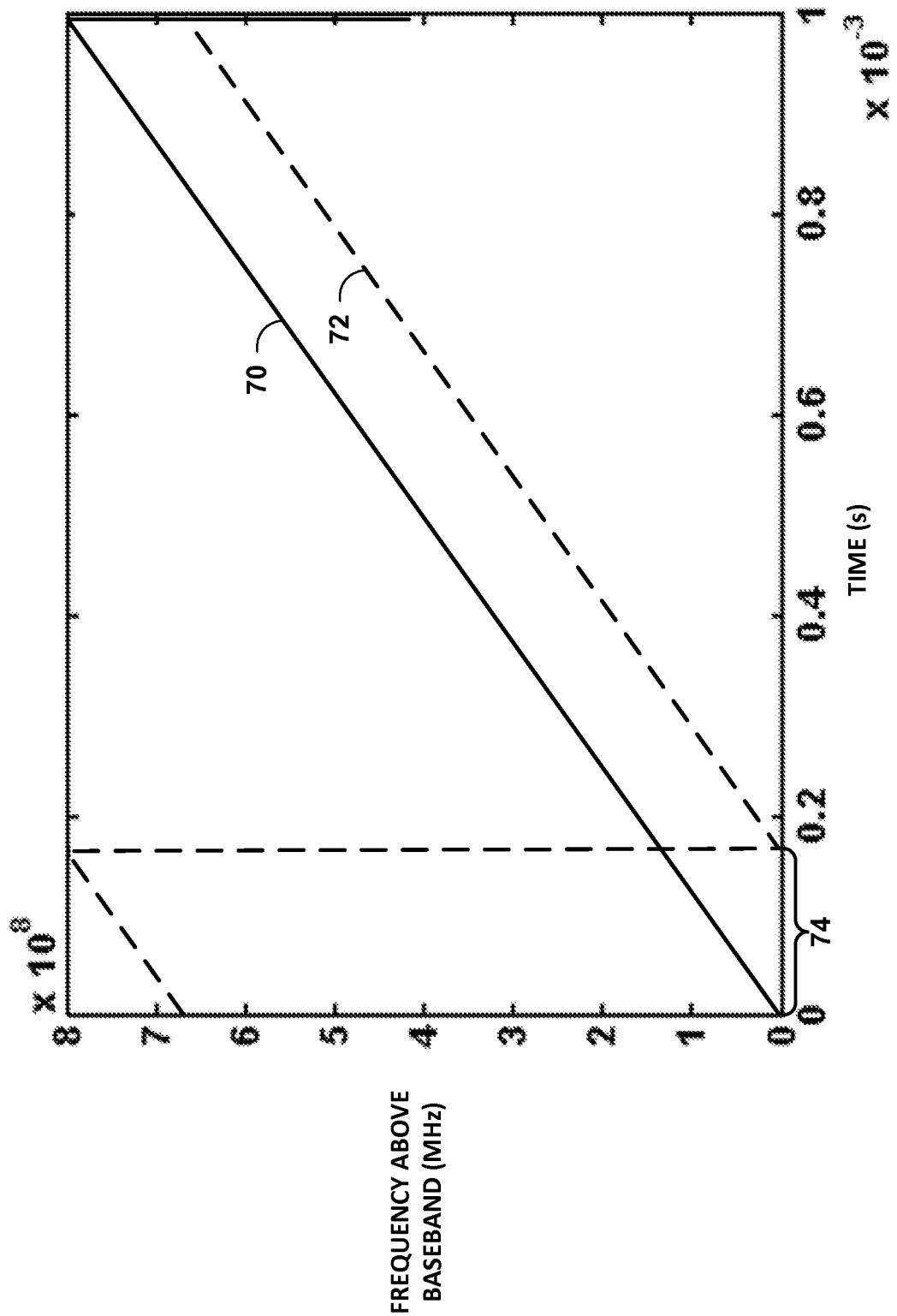
FIG. 5 illustrates a graph of another example time-of-flight delay between a transmitted signal from a first radar and a transmitted signal from a second radar, in accordance with various aspects of this disclosure.

FIG. 5 illustrates a graph of another example time-of-flight delay 74 between transmitted signal 70 from a first radar and transmitted signal 72 from a second radar, in accordance with various aspects of this disclosure. FIG. 5 is described with reference to FIGS. 1 and 4.

For ease of understanding, FIG. 5 is described with respect to linear frequency modulation of FMCW signals; however, non-linear frequency modulation of the FMCW signals may also be applicable. In some examples, the non-linear frequency modulation of the FMCW signals may enable clock synchronization between radars 2 and 8.

In the example of FIG. 5, signal 70 may correspond to transmitted signal 16 or 60 from radar 2. In the example of FIG. 5, signal 72 may correspond to transmitted signal 20 or 62. In the example of FIG. 5, time-of-flight delay 74 may partially correspond to the time-of-flight delay 64 between transmitted signals 60 and 62 as described in FIG. 4.

In the example of FIG. 5, the clocks of radars 2 and 8 may not be synchronized (e.g., clock skew), which may add to or subtract from time-of-flight delay 64 between signals 60 and 62 as described in FIG. 4 to create time-of-flight delay 74 between signals 70 and 72. For example, the clock skew between radars 2 and 8 may change the delay between (e.g., time-of-flight delay 74) signals 70 and 72 from being received at radars 2 and 8. In other words, time-of-flight delay 74 may be changed by clock skew (e.g., subtracting) from time-of-flight delay 64 as described in FIG. 4 to be 0.1 ms less. For example, time-of-flight delay 74 between signals 70 and 72 may be 0.00018 seconds instead of 0.00028 seconds.

Figure 6:
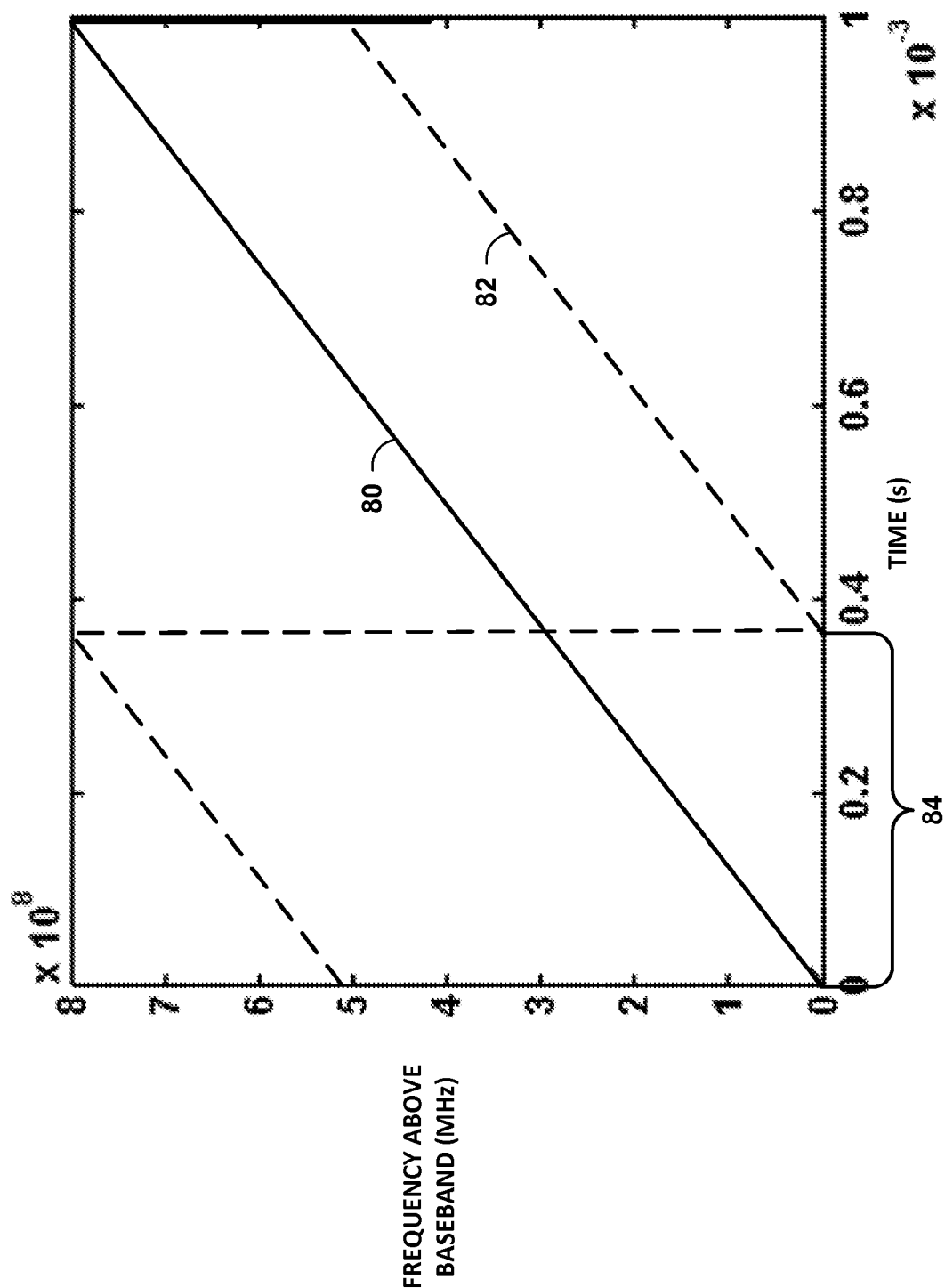
FIG. 6 illustrates a graph of another example time-of-flight delay between a transmitted signal from a first radar and a transmitted signal from a second radar, in accordance with various aspects of this disclosure.

FIG. 6 illustrates a graph of another example time-of-flight delay 84 between transmitted signal 80 from a first radar and transmitted signal 82 from a second radar, in accordance with various aspects of this disclosure. FIG. 6 is described with reference to FIGS. 1 and 4.

For ease of understanding, FIG. 6 is described with respect to linear frequency modulation of FMCW signals; however, non-linear frequency modulation of the FMCW signals may also be applicable. In some examples, the non-linear frequency modulation of the FMCW signals may enable clock synchronization between radars 2 and 8.

In the example of FIG. 6, signal 80 may correspond to transmitted signal 16 or 60 from radar 2. In the example of FIG. 6, signal 82 may correspond to transmitted signal 20 or 62. In the example of FIG. 6, time-of-flight delay 84 may partially correspond to the time-of-flight delay 64 between transmitted signals 60 and 62 as described in FIG. 4.

In the example of FIG. 6, the clocks of radars 2 and 8 may not be synchronized (e.g., clock skew), which may add to or subtract from time-of-flight delay 64 between signals 60 and 62 as described in FIG. 4 to create time-of-flight delay 84 between signals 80 and 82. For example, the clock skew between radars 2 and 8 may change the delay (e.g., time-of-flight delay 84) between signals 80 and 82 from being received at radars 2 and 8. In other words, time-of-flight delay 84 may be changed by clock skew adding to time-of-flight delay 64 as described in FIG. 4, such that time-of-flight delay 84 between signals 80 and 82 may be 0.00038 seconds instead of 0.00028 seconds.

Figure 7:
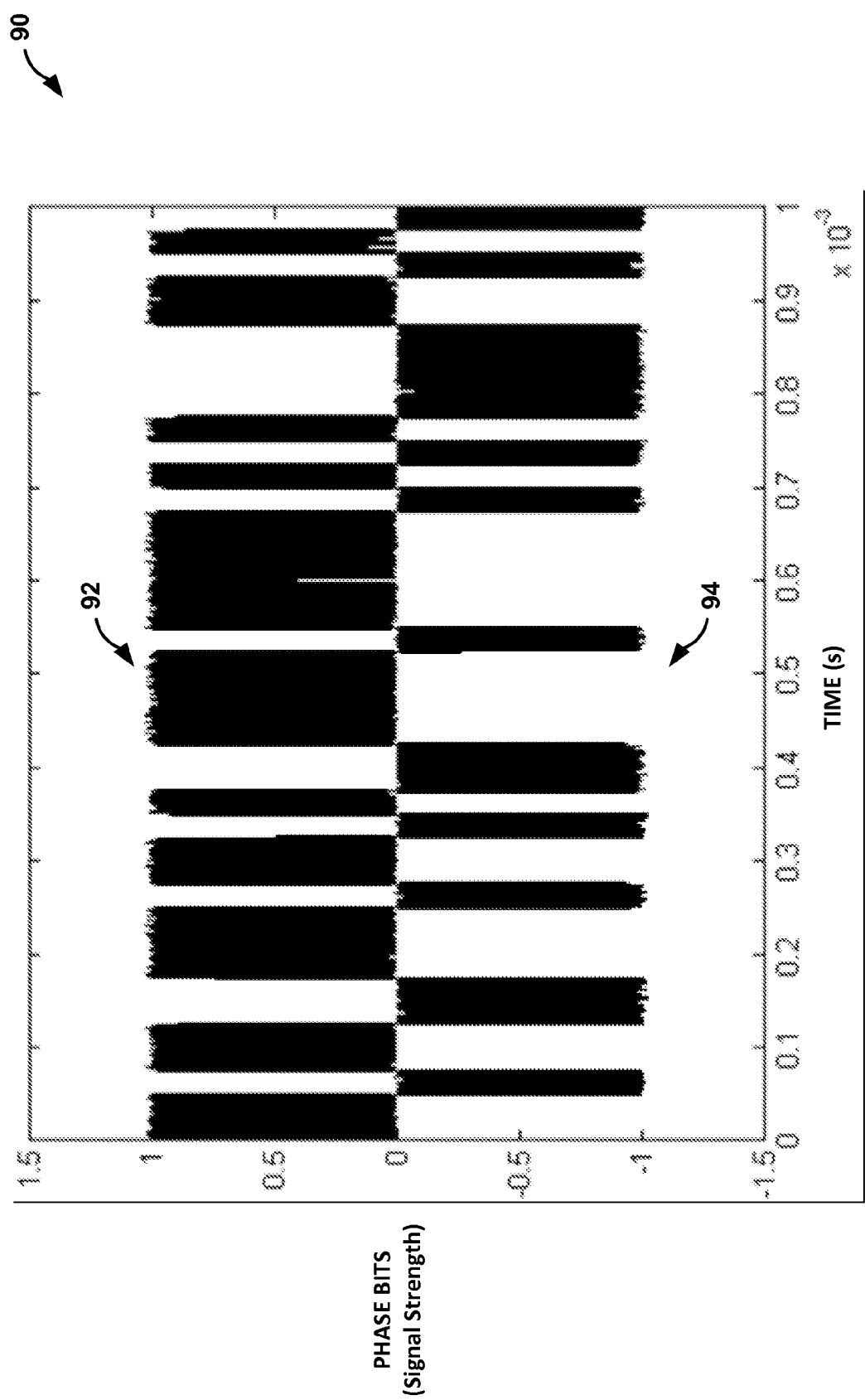
FIG. 7 illustrates a graph of an example of phase bits extracted from a matched filter, in accordance with various aspects of this disclosure.

FIG. 7 illustrates a graph of an example of signal 90, in accordance with various aspects of this disclosure. FIG. 7 is described with reference to FIG. 1. In the example of FIG. 7, signal 90 may correspond to one of respective signals 18 and 22 as described in FIG. 1, and may include HIGH phase bits 92 and LOW phase bits 94. Signal 90 is a received signal after mixing with the local signal and applying the matched filter. In this example, the local transmitted phase bits are removed before mixing the local signal with signal 90. HIGH phase bits 92 are the result of phase shifted sections (e.g., phase shifted by 0) of signal 90. LOW phase bits 94 are the result of phase shifted sections (e.g., phase shifted by $\pi$) of signal 90. In some examples, the phase shift may represent a multiplication of the transmitted signal by +1 or −1. In some examples, the value of signal 90 at time $t_i$ is just $O_{mi}O_i$. In some examples, the units of signal 90 (e.g., units of HIGH and LOW phase bits 92 and 94) may be the signal strength of signal 90.

In some examples, radars 2 and 8 may perform an optimization that maximizes the error function E to obtain the various timing and frequency parameters. According to error function E as expressed in Equation 10 as described in FIG. 1, any change in any of the values of $O_i$ or $O_{mi}$ may change the value of E. In some examples, radars 2 and 8 may alter error function E, as expressed as Equation 17, to create error function E prime (E'), where E' is immune to sign changes in any of the values of $O_i$ or $O_{mi}$.

$$E' = \Sigma_i (O_{mi})^2 (O_i)^2 \quad (17)$$

In this way, radars 2 and 8 may change the phase of transmitted respective signals 16 and 20 by $\pi$ at an appropriate rate without impacting the error function E' or the optimization of E'. In other words, radars 2 and 8 may use transmitted respective signals 16 and 20 for time synchronization and communication between radars 2 and 8, when radars 2 and 8 use the error function E' for optimization.

In some examples, the frequency sweep for radars 2 and 8 may be modified to use phase bits. For example, transmitted respective signals 16 and 20 may have phase shifts (e.g., HIGH phase bits 92 and LOW phase bits 94) by $\pi$ at regular intervals. In this example, radars 2 and 8 may determine the timing parameters as described in FIG. 1 after removing HIGH phase bits 92 and LOW phase bits 94 from transmitted respective signals 16 and 20 by multiplying the measured ADC samples by ±1. For example, in the local transmitted signal, phase shifts may have been inserted at regular intervals in order to transmit data to the other radar. During each of the intervals, the phase shift is either zero or $\pi$, which may result in the transmitted signal being multiplied by +1 or −1. The transmitting radar may know the phase bit pattern, and the transmitting radar may remove the local transmitted phase shifts from the signal formed by the mixing of the local signal and the received signal by multiplying the mixed signal by a +1 or a −1 for each of the regular intervals, which may leave only the phase shifts from the received signal. Then, by multiplying the mixed signal by the matched filter, a signal as illustrated in FIG. 7 is determined. In other words, radars 2 and 8 may use the full timing information that has been determined to know which ADC samples belong to which of the transmitted phase bits. In some examples, HIGH phase bits 92 and LOW phase bits 94 of received respective signals 18 and 22 may be obtained by looking at the product of the actual output of the ADC at time $t_i$, $O_{mi}$, and the calculated output of the ADC at time $t_i$, $O_i$.

In some examples, the rate of communication may be determined by the sampling rate of the ADC, such that the length of HIGH phase bits 92 and LOW phase bits 94 may be long enough that the sampling rate of the ADC can separate two bits. In some examples, HIGH phase bits 92 and LOW phase bits 94 may each have a length of 25 microseconds (μs). In some examples, as described in FIG. 1, radars 2 and 8 may generate a matched filter using a subsample of the ADC output. In these examples, radars 2 and 8 may use the matched filter, and apply the match filter to the full sample of the ADC to get the communication of HIGH phase bits 92 and LOW phase bits 94 at the highest rate possible. In other words, radars 2 and 8 may use a subsample of the ADC to generate a matched filter, which may then be used for the full sample of the ADC to increase the communication rate.

Figure 8:
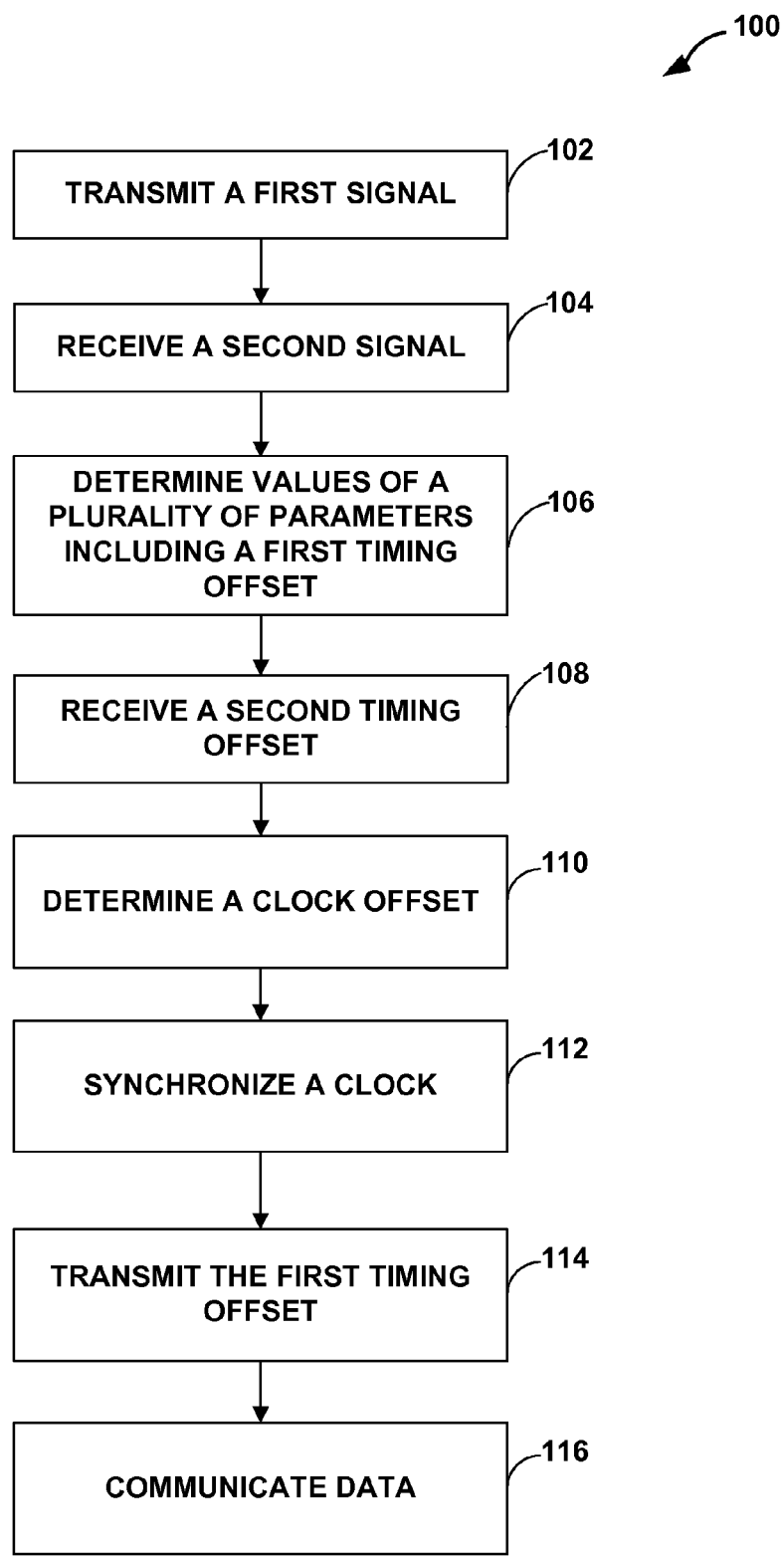
FIG. 8 illustrates a flowchart illustrating an example method of operating a FMCW radar system with clock synchronization, in accordance with various aspects of this disclosure.

FIG. 8 illustrates a flowchart illustrating an example technique 100 of operating FMCW radar system with clock synchronization, in accordance with various aspects of this disclosure. FIG. 8 is described with respect to FIG. 1, and in particular radar 2 although it is contemplated that technique 100 may also be applied to radar 8. In the example of FIG. 8, radar 2 may transmit a first signal (102). A frequency of the first signal, $f_t$, may vary over a first frequency range around a first baseband frequency. In the example of FIG. 8, radar 2 may also receive a second signal (104). A frequency of the second signal, $f_r$, may vary over a second frequency range around a second baseband frequency.

In the example of FIG. 8, radar 2 may determine values of a plurality of parameters including a first timing offset of radar 2 (106). Radar 2 may, for example, determine the values of the plurality of parameters based on a digital difference signal between the first and second signals. In some examples, radar 2 may determine the values of the plurality of parameters based on the digital difference signal by selecting a first subsample of a total sample of the digital difference signal. The subsample may, for example, be less than the total sample. Radar 2 may determine a value of the first timing offset of the plurality of parameters by performing a one-dimensional search of the first subsample. Radar 2 may select the first subsample such that effects of the other parameters of the plurality of parameters on the first subsample are small compared to an effect of the first timing offset on the first subsample. In these examples, responsive to determining the value of the first parameter, radar 2 may determine a value of a second parameter of the plurality of parameters. For example, radar 2 may perform a second one-dimensional search of the first subsample. In some examples, radar 2 may determine the plurality of parameters comprises at least one of a first timing offset, $$\frac{d}{c} + \Delta t,$$

a clock skew, α, a relative velocity, β, a second baseband frequency, $f_{b2}$, or an ADC measurement offset, Δτ. In some examples, the digital difference signal may be an output of the ADC. In these examples, an input to the ADC may be a difference signal from a mixer. In some examples, the difference signal of the mixer may be a difference between the frequency of signal 16 and the frequency of signal 18. In some examples, the first subsample may be a first one thousand and twenty-four samples of the total sample of the digital difference signal. In some examples, the second parameter may, for example, be a value of the second baseband frequency, such as the baseband frequency of signal 18. In some examples, radar 2 may after determining the values of the first and second parameters, select a second subsample of the total sample of the difference signal. In some examples, the second subsample may be less than the total sample. In some examples, radar 2 may determine the values of the remaining parameters of the plurality of parameters by a local optimization of first and second derivatives using the second subsample.

In the example of FIG. 8, radar 2 may receive a second timing offset of a second FMCW radar unit (e.g., radar 8) (108). In the example of FIG. 8, radar 2 may determine a clock offset based on the first and second timing offsets (110). In the example of FIG. 8, radar 2 may synchronize a clock of radar 2 with a clock of the second FMCW radar unit (e.g., radar 8) based on the clock offset (112). In the example of FIG. 8, radar 2 may transmit the first timing offset of radar 2 to the second FMCW radar unit (e.g., radar 8) (114).

In the example of FIG. 8, radar 2 may communicate data between radar 2 and the second FMCW radar unit (116). In some examples, radar 2 may transmit data by including phase bits at regular intervals in the first signal transmitted by radar 2. In some examples, radar 2 may communicate data between radar 2 and the second FMCW radar unit. In some examples example, radar 2 may generate a plurality of phase bits at regular intervals in signal 16. In these examples, radar 2 may also determine a plurality of phase bits of signal 18 by determining a product of the calculated output of the ADC and the actual output of the ADC. In some examples, radar 2 may remove the phase bits of the first signal from the digital difference signal. In some examples, radar 2 may also multiply the actual output of the ADC by plus or minus one. In some examples, radar 2 may synchronize the clock of radar 2 with the clock of the second FMCW radar unit, which may increase a rate of data communication between radar 2 and second FMCW radar unit. In some examples, the rate of data communication may be determined by a sampling rate of the ADC. In some examples, the plurality of phase bits of the signals 16 or 18 may each have a duration of 25 microseconds (μs).

In some examples, the first timing offset may include a time-of-flight delay and a clock offset of radar 2 at a first time, $$t_D = \frac{d}{c} + \Delta t,$$

and the received timing offset of the second FMCW radar unit (e.g., radar 8) may include a time-of-flight delay and a clock offset at a second time, $$t_R = \frac{d}{c} + \Delta t.$$

In these examples, radar 2 may determine the clock offset based on the difference between the first and second timing offsets, $$\Delta t_O = \frac{(t_D - t_R)}{2}.$$

In other examples, when a distance between radar 2 and the second FMCW radar unit is changing over time, the first timing offset may include a time-of-flight delay and a clock offset of radar 2 at a first time, $$t_D = \frac{d}{c} + \Delta t,$$

and the received timing offset of the second FMCW radar unit (e.g., radar 8) may include a time-of-flight delay and a clock offset at a second time, $$t_R = \frac{d}{c} - \beta \Delta t - \Delta t.$$

In these examples, radar 2 may determine the clock offset may include determining the clock offset based on the difference between the first and second timing offsets, $$\Delta t_O = \frac{(t_D - t_R)}{2 + \beta}.$$

In some examples, an uncertainty of the clock offset determined by radar 2 may be equal to or less than ten picoseconds (ps), and the uncertainty of the clock offset may be the difference in synchronization between the clocks of radar 2 and the second FMCW radar unit.

In some examples, radar 2 may determine the values of the plurality of parameters including timing and frequency parameters based on the digital difference signal by maximizing an error function. For example, the error function may be described as $E = \Sigma_i O_{mi} O_i$, where $O_{mi}$ may be the actual output of the ADC, where $O_i = \cos\{2\pi i(t_i + \Delta \tau)[f_t - f_r] + \theta\}$ may be the calculated output of the ADC, where $t_i$ may be a time at an ith measurement of the ADC, and where $\theta$ may the overall phase difference.

In some examples, radar 2 may determine the values of the plurality of parameters including timing and frequency parameters based on the digital difference signal by optimizing a prime error function. For example, the prime error function may be described as $E' = \Sigma_i (O_{mi})^2 (O_i)^2$, where $O_{mi}$ may be the actual output of the ADC, where $O_i = \cos\{2\pi i (t_i + \Delta \tau)[f_t - f_r] + \theta\}$ may be the calculated output of the ADC, where $t_i$ may be a time at an ith measurement of the ADC, and where $\theta$ may be the overall phase difference.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for FMCW signal processing. Also, the techniques could be fully implemented in one or more circuits or logic elements.

The techniques of this disclosure may be implemented in a wide variety of devices or apparatuses configured for transmitting or receiving radar. The devices and apparatuses may, for example include integrated circuits (ICs) or sets of ICs (e.g., a chip set). Various components, modules, or units are described in this disclosure to emphasize functional aspects of devices configured to perform the disclosed techniques, but do not necessarily require realization by different hardware units. Rather, as described above, various units may be provided by a collection of interoperative hardware units, including one or more processors as described above, in conjunction with suitable software and/or firmware.

Various illustrative aspects of the disclosure are described above. These and other aspects are within the scope of the following claims.

The invention claimed is:

1. A method of synchronizing clocks of Frequency-Modulated-Continuous-Wave (FMCW) radar units, the method comprising:
   transmitting a first signal of a first FMCW radar unit, a frequency of the first signal varying over a first frequency range around a first baseband frequency;
   receiving a second signal at the first FMCW radar unit, a frequency of the second signal varying over a second frequency range around a second baseband frequency;

determining values of a plurality of parameters including a first timing offset of the first FMCW radar unit based on a digital difference signal between the first and second signals, wherein the first timing offset comprises a first time-of-flight delay and a first clock offset of the first FMCW radar unit at a first time;

receiving a second timing offset of a second FMCW radar unit, wherein the second timing offset of the second FMCW radar unit comprises a second time-of-flight delay and a second clock offset at a second time;

determining a third clock offset based on a difference between the first timing offset and the second timing offset; and synchronizing a clock of the first FMCW radar unit with a clock of the second FMCW radar unit based on the third clock offset.

2. The method of claim 1, wherein determining the values of the plurality of parameters based on the digital difference signal comprises:

selecting a first subsample of a total sample of the digital difference signal, wherein the subsample is less than the total sample; and determining a value of the first timing offset of the plurality of parameters by performing a one-dimensional search of the first subsample, the first subsample selected such that effects of other parameters of the plurality of parameters on the first subsample are small compared to an effect of the first timing offset on the first subsample.

3. The method of claim 2, wherein determining the values of the plurality of parameters based on the digital difference signal further comprises:

responsive to determining the value of the first timing offset, determining a value of a second parameter of the plurality of parameters by performing a second one-dimensional search of the first subsample.

4. The method of claim 1, wherein the plurality of parameters comprises one or more of the first timing offset, a clock skew, a relative velocity, the second baseband frequency, and an analog-to-digital converter (ADC) measurement offset.

5. The method of claim 1, wherein a distance between the first and second FMCW radar units is changing over time.

6. The method of claim 1, further comprising:
transmitting the first timing offset of the first FMCW radar unit to the second FMCW radar unit.

7. The method of claim 1, further comprising:
transmitting data of the first FMCW radar unit by including phase bits at regular intervals in the first signal.

8. The method of claim 1, further comprising:
communicating data between the first FMCW radar unit and the second FMCW radar unit by:
generating a plurality of phase bits at regular intervals in the first signal; and
determining a plurality of phase bits of the second signal by a product of a calculated output of the ADC and an actual output of the ADC.

9. A Frequency-Modulated-Continuous-Wave (FMCW) radar device, the device comprising:
a clock to drive an oscillator, wherein the oscillator is configured to transmit a first signal from an RF antenna, and wherein a frequency of the first signal varies over a first frequency range around a first baseband frequency;
a mixer configured to receive a second signal from the RF antenna and generate a difference signal based on the first signal and the second signal, wherein a frequency of the second signal varies over a second frequency range around a second baseband frequency;
an analog-to-digital converter configured to generate a digital difference signal based on the difference signal generated by the mixer; and
a signal processing unit, wherein the signal processing unit is configured to:
determine values of a plurality of parameters including a first timing offset based on the digital difference signal, wherein the first timing offset comprises a first time-of-flight delay and a first clock offset of the first FMCW radar unit at a first time;
receive a second timing offset of a second FMCW radar unit, wherein the second timing offset of the second FMCW radar unit comprises a second time-of-flight delay and a second clock offset at a second time;
determine a third clock offset based on a difference between the first timing offset and the second timing offset; and
synchronize the clock with a clock of the second FMCW radar unit based on the third clock offset.

10. The device of claim 9, wherein the signal processing unit is further configured to transmit the first timing offset.

11. The device of claim 9, wherein the plurality of parameters comprises one or more of the first timing offset, a clock skew, a relative velocity, the second baseband frequency, and an ADC measurement offset.

12. The device of claim 9, wherein a distance between the FMCW radar device and the second FMCW radar unit is changing over time.

13. The device of claim 12, wherein an uncertainty of the third clock offset is equal to or less than ten picoseconds (ps), and wherein the uncertainty of the third clock offset is a difference in synchronization between the clocks of the first and second FMCW radar units.

14. A Frequency-Modulated-Continuous-Wave (FMCW) radar system, the system comprising:
a plurality of FMCW radar units, wherein each FMCW radar unit of the plurality of FMCW radar units comprise:
a clock configured to drive an oscillator, wherein the oscillator is configured to transmit a first signal from an RF antenna, and wherein a frequency of the first signal varies over a first frequency range around a first baseband frequency;
a mixer configured to receive a second signal from the RF antenna and generate a difference signal based on the first signal and the second signal, wherein a frequency of the second signal varies over a second frequency range around a second baseband frequency;
an analog-to-digital converter (ADC) configured to generate a digital difference signal based on the difference signal generated by the mixer; and
a signal processing unit, wherein the signal processing unit is configured to:
determine values of a plurality of parameters including a first timing offset based on the digital difference signal, wherein the first timing offset comprises a first time-of-flight delay and a first clock offset at a first time;
receive a second timing offset, wherein the second timing offset comprises a second time-of-flight delay and a second clock offset at a second time;

determine a third clock offset based on a difference between the first timing offset and the second timing offset; and synchronize the clock with the third clock offset.

15. The system of claim 14, wherein the signal processing unit is further configured to transmit the first timing offset to another FMCW radar unit of the plurality of FMCW radar units.

16. The system of claim 14, wherein the signal processing unit of each FMCW radar unit is configured to communicate with another FMCW radar unit of the plurality of FMCW radar units comprises generating phase bits in the first signal and determining phase bits of the second signal by a product of a calculated output of the ADC and an actual output of the ADC.

17. The system of claim 16, wherein determining the phase bits of the second signal by the product of the calculated output of the ADC and the actual output of the ADC comprises removing the phase bits of the first signal from the digital difference signal and multiplying the actual output of the ADC by plus or minus one.

18. The system of claim 16, wherein the signal processing unit is configured to synchronize the clock with the third clock offset increases a rate of data communication between the plurality of FMCW radar units, wherein the rate of data communication is determined by a sampling rate of the ADC, and wherein the plurality of phase bits of the first and second signals have a duration of 25 microseconds ($\mu$s).

\* \* \* \* \*